United States Patent [19]
Yamamoto et al.

[11] Patent Number: 5,376,420
[45] Date of Patent: Dec. 27, 1994

[54] CURABLE SILICONE-BASED RELEASE AGENT, SEPARATOR HAVING CURED FILM FORMED FROM THE SAME, AND PRESSURE-SENSITIVE TAPE HAVING CURED FILM FORMED FROM THE SAME

[75] Inventors: Takayuki Yamamoto; Yoshihiro Minamizaki, both of Osaka, Japan

[73] Assignee: Nitto Denko Corporation, Osaka, Japan

[21] Appl. No.: 909,677

[22] Filed: Jul. 7, 1992

[30] Foreign Application Priority Data

Jul. 17, 1991 [JP] Japan .................................. 3-203788
Dec. 4, 1991 [JP] Japan .................................. 3-348153

[51] Int. Cl.⁵ ............................................. C08L 83/04
[52] U.S. Cl. ...................................... 428/40; 428/447; 525/100; 525/477
[58] Field of Search .................. 525/100, 477; 428/40, 428/447

[56] References Cited

U.S. PATENT DOCUMENTS

| | | | |
|---|---|---|---|
| 3,770,687 | 11/1973 | Mestetsky | 525/100 |
| 3,855,052 | 12/1974 | Mestetsky | 525/100 |
| 4,935,458 | 6/1990 | Suzuki et al. | 525/100 |
| 5,154,962 | 10/1992 | Mertens et al. | 525/100 |

FOREIGN PATENT DOCUMENTS 420585 4/1991 European Pat. Off. .
59-059750 4/1984 Japan .

*Primary Examiner*—Ralph H. Dean
*Attorney, Agent, or Firm*—Sughrue, Mion, Zinn, Macpeak & Seas

[57] ABSTRACT

A curable silicone-based release agent which comprises 100 parts by weight of a polyorganosiloxane and from 0.1 to 1,000 parts by weight of resin fine particles which are readily swellable or soluble in an organic solvent, said release agent being capable of forming a cured film having an oil-based ink adsorbing property.

14 Claims, No Drawings

CURABLE SILICONE-BASED RELEASE AGENT, SEPARATOR HAVING CURED FILM FORMED FROM THE SAME, AND PRESSURE-SENSITIVE TAPE HAVING CURED FILM FORMED FROM THE SAME

FIELD OF THE INVENTION

The present invention relates to a curable silicone-based release agent which forms a cured film having an excellent balance between adhesion and releasability and excellent oil-based ink printability, and also relates to a separator and a pressure-sensitive tape both having such a cured film formed from the release agent.

BACKGROUND OF THE INVENTION

For use in back-side treatment of pressure-sensitive tapes and formation of separators for the surface protection of pressure-sensitive adhesive layers, and the like, various kinds of release agents have been proposed so far which include a silicone type, a long-chain alkyl type, and the like. A release agent for use in the above purposes is required to give a release film having an adequate balance between adhesion and releasability. That is, since a release film is bonded to the surface of a pressure-sensitive adhesive layer in an easily strippable manner, adhesion and releasability should be balanced both at the interface between the release film and its substrate and at the interface between the release film and the pressure-sensitive adhesive layer.

However, release films obtained from any of the conventional release agents have been defective in that they have a poor balance between adhesion and releasability. In the case of pressure-sensitive tapes, for example, there have been the following problems. If the adhesion of the release film to the pressure-sensitive adhesive layer is too strong, the pressure-sensitive tape poses a problem that when the tape is rolled up and the roll thereof is stored for a long period of time or under high temperature conditions, the roll becomes unable to rewind. If the adhesion to the pressure-sensitive adhesive layer is too weak, the roll has a problem that the pressure-sensitive adhesive layer slides on the release film and, as a result, the pressure-sensitive adhesive layer is partly exposed and fouled. On the other hand, if the adhesion of the release film to its substrate is too weak, this poses a problem that the release film peels off its substrate, i.e., from the back side of the tape, and is transferred to the pressure-sensitive adhesive layer.

The conventional silicone-based release agents have also had a problem that since cured films obtained therefrom repel oil-based inks, writing such as addressing on the cured films with an oil-based ink is impossible.

In an attempt to develop a silicone-based release agent which forms a cured film on which writing with an oil-based ink is possible, a release agent comprising a blend of a special polyorganosiloxane and ethyl cellulose has been proposed (JP-B-60-1899 and JP-A-59-147048). (The terms "JP-B" and "JP-A" as used herein mean an "examined Japanese patent publication" and an "unexamined published Japanese patent application", respectively.) This release agent, however, has had a problem that it is unsuitable for non-solvent coating because it should be used as a dispersion in an organic solvent in order to obtain the viscosity and homogeneity required as a release agent.

Under these circumstances, the present inventors previously proposed a silicone-based release agent which forms a cured film on which writing with an oil-based ink was possible (JP-A-2-129219).

Into the above silicone-based release agent proposed by the present inventors, fine particles of a silicone rubber elastomer have been incorporated for the purpose of imparting oil-based ink printability to cured films obtained from the release agent. However, this release agent has had a drawback that it is difficult to improve the adhesion strength thereof probably because the release agent is of a silicone type. It has also been found that the proposed release agent has a problem that cured films obtained therefrom are unsatisfactory in oil-based ink printability, or in the property of fixing printed oil-based inks of some kinds, probably because the fine particles of a silicone rubber elastomer contribute only to an improvement in wettability by an oil-based ink. Illustratively stated, cured films obtained from the above release agent have been found to have problems that repelling is apt to occur when oil-based inks containing certain kinds of solvents, e.g., alcohol-type solvents, as main components are applied on the cured films, and that penetration of oil-based inks into the cured films is insufficient and, hence, characters formed by printing oil-based inks on the cured films are apt to fall off by abrasion, etc.

SUMMARY OF THE INVENTION

An object of the present invention is to provide a curable silicone-based release agent which forms a cured film having further improved balance between adhesion and releasability and excellent oil-based ink printability, especially an ability to fix printed oil-based inks thereto.

Another object of the present invention is to provide a separator comprising a substrate having formed thereon a cured film formed from the above curable silicone-based release agent.

Still another object of the present invention is to provide a pressure-sensitive tape having on the back side thereof a cured film formed from the above curable silicone-based release agent.

The curable silicone-based release agent of the present invention comprises 100 parts by weight of a polyorganosiloxane and from 0.1 to 1,000 parts by weight of resin fine particles which are readily swellable or soluble in an organic solvent, and is capable of forming a cured film having an oil-based ink adsorbing property.

The resin fine particles having an affinity for organic solvents are included, when the release agent of the present invention is coated and cured, in the thus-formed silicone-based cured film to improve penetration of oil-based inks into the cured film, thereby imparting oil-based ink adsorbability and oil-based ink printability to the cured film.

DETAILED DESCRIPTION OF THE INVENTION

The polyorganosiloxane used in the present invention is an oily polyorganosiloxane, from the stand-point of enabling the release agent to be coated without using a solvent by non-solvent coating. The polyorganosiloxane preferably has a number-average molecular weight of from 100 to 500,000, more preferably from 1,000 to 100,000. Therefore, any of silicone compositions which are known as a non-solvent coating type silicone-based release agent and comprise a polyorganosiloxane having a curable functional group can be used in the present invention.

Representative examples of the above silicones include an addition reaction type silicone which comprises an alkenyl group-containing polyorganosiloxane and a polyorganohydrogensiloxane blended in a proportion such that the molar ratio of SiH units to C—C units is in the range of from 0.1 to 10 and which is formulated to be cured with a platinum catalyst, and a condensation reaction type silicone which comprises a silanol group-containing polyorganosiloxane and a polyorganohydrogensiloxane and is formulated to be cured with a catalyst such as a carboxylic acid metal salt.

Examples of the polyorganosiloxane used in the present invention further include a moisture-curing silicone comprising an alkoxy or acyloxy group-containing polyorganosiloxane and formulated to cure upon exposure to moisture in air, a radical-reactive silicone comprising a radical-reactive functional group-containing polyorganosiloxane and, if required, a free-radical initiator and formulated to be cured with heat, ultraviolet rays, electron beams, or the like, and a cationic polymerization type silicone comprising an epoxy group-containing polyorganosiloxane and formulated to be cured with an onium salt type catalyst such as a diazonium salt, sulfonium salt, or iodonium salt.

A polyorganosiloxane represented by the following formula (I) is preferably used in the present invention:

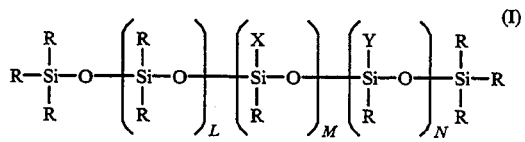

wherein R represents an alkyl group having from 1 to 20 carbon atoms, a cycloalkyl group, an aryl group, or an aralkyl group, X represents an epoxy-functional organic group, Y represents a polyether-polymethylene group, and L, M, and N are numbers such that M/(L+M+N) is from 0.05 to 90% and N/(L+M+N) is from 0.5 to 90%.

The polyorganosiloxane represented by the formula (I) described above has excellent compatibility with curing catalysts, especially onium salt type curing catalysts, due to the presence of a polyether-polymethylene group in the polymer molecule, so that it shows good and stable ultraviolet curability or heat curability.

In the formula (I) above, R represents an alkyl group having from 1 to 20 carbon atoms, a cycloalkyl group, an aryl group, or an aralkyl group. Examples of the cycloalkyl group include cyclohexyl and cycloheptyl. Examples of the aryl group include phenyl, tolyl, and xylyl. Examples of the aralkyl group include benzyl, phenyl, and phenylethyl. From the standpoint of releasability, the group of R preferably is methyl or phenyl.

X in the formula (I) above represents an epoxy-functional organic group. Examples thereof include the following groups.

δ-Glycidyloxypropyl group:

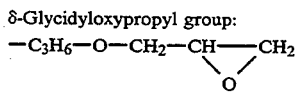

β-(3, 4-Epoxycyclohexyl)ethyl group:

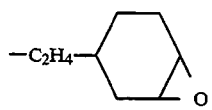

β-(4-Methyl-3, 4-epoxycyclohexyl)propyl group:

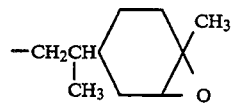

Y in the formula (I) above represents a polyether-polymethylene group. This group is not particularly limited so long as it is derived from a polyether-polymethylene group-containing compound having good compatibility with onium salt type curing catalysts. Examples of Y include a group represented by the following formula:

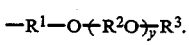

In the above formula, $R^1$ represents a polymethylene group; $R^2$ represents ethylene group [—CH$_2$CH$_2$—], propylene group [—CH$_2$CH(CH$_3$)—], or butylene group [—CH$_2$CH(C$_2$H$_5$)—]; and $R^3$ represents hydrogen atom or an alkyl group having from 1 to 20 carbon atoms.

In the present invention, the polymethylene group ($R^1$) preferably is trimethylene group [—CH$_2$CH$_2$CH$_2$—] from the standpoint of easy availability of raw materials. The degree of polymerization (y) of the polyether group is preferably from 2 to 100, more preferably from 2 to 40, although the range varies depending on the content of the polyether-polymethylene group in the polyorganosiloxane.

L, M, and N in the formula (I) above mean the numbers of the respective structural units contained in the molecule. In the present invention, M/(L+M+N) is generally from 0.05 to 90%, preferably from 0.1 to 80%, and N/(L+M+N) is generally from 0.5 to 90%, preferably from 1 to 80%. If M/(L+M+N) is below 0.05%, the release agent obtained using such a polyorganosiloxane shows poor curability, while if it exceeds 90%, the release agent forms cured films having poor releasability. On the other hand, if N/(L+M+N) is below 0.5%, such a polyorganosiloxane shows poor compatibility with onium salt type curing catalysts and the release agent obtained using the polyorganosiloxane has poor curability, while if it exceeds 90%, the release agent forms cured films having poor releasability.

The polyorganosiloxane of the formula (I) which contains an epoxy-functional organic group and a polyether-polymethylene group in the molecule thereof is prepared by, for example, the following method.

As a raw material, a polysiloxane is used in which the hydrogen atoms are partly replaced by an alkyl group having from 1 to 20 carbon atoms, a cycloalkyl group, an aryl group, or an aralkyl group so that unreplaced hydrogen atoms remain in a predetermined number so as to enable production of a polyorganosiloxane in which the content of each structural unit is in the above-specified range. This polysiloxane is reacted with a predetermined amount of an epoxy group-containing compound having either an ethylenic double bond as in an olefin glycidyl ether or a functional group reactive to a silicon-bonded hydrogen atom and a predetermined amount of a polyether compound having either an ethylenic double bond as in an olefin-ethylene glycol or a functional group reactive to a silicon-bonded hydrogen atom, thereby to incorporate the epoxy group-containing compound and polyether compound into the polysiloxane through hydrosilylation or other reaction with the unreplaced hydrogen atoms of the polysiloxane.

In the polyorganosiloxane used in the present invention, the structural units of the formulae

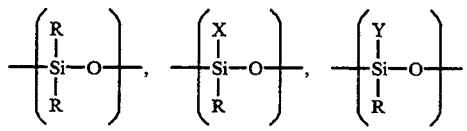

may be linked to form a block copolymer-like polymer chain or may be linked to form a polymer chain in which the structural units are randomly distributed.

The resin fine particles used in the present invention are particles which readily absorb organic solvents or readily swell or dissolve in organic solvents. Particularly preferably used as the resin fine particles are particles which show the property of readily absorbing or readily swelling or dissolving in organic solvents, especially solvents used in oil-based inks, at 25° C. or room temperature.

Examples of the resin fine particles generally used include fine particles of various resins that are not a silicone, such as acrylic resin fine particles, styrene resin fine particles, phenolic resin fine particles, epoxy resin fine particles, melamine resin fine particles, cellulosic resin fine particles, urethane resin fine particles, and polyester resin fine particles, and fine particles made of crosslinked polymers obtained by cross-linking these polymers or made of mixtures or copolymers of these poisoners. Particularly preferably used of these are fine particles of an acrylic resin and fine particles of a crosslinked acrylic resin. The resin fine particles may have a functional group such as hydroxyl group or carboxyl group.

It is preferred that the resin fine particles have an average particle diameter of from 0.001 to 100 μm. The shape of each particle is not particularly limited and may be, for example, spherical, doughnut-like, flat, or the like. The resin fine particles may also be porous. Further, they may be agglomerated particles each made up of minute particles.

The amount of the resin fine particles added to the release agent usually is from 0.1 to 1,000 parts by weight, preferably from 1 to 100 parts by weight, per 100 parts by weight of the polyorganosiloxane. If the amount of the resin fine particles added is below 0.1 part by weight, cured films formed from the release agent have poor oil-based ink printability. If the amount thereof exceeds 1,000 parts by weight, not only cured films formed from the release agent show poor releasability, but also the release agent becomes to have an increased viscosity and, as a result, the non-solvent applicability thereof is apt to be impaired.

If required and necessary, a curing catalyst is added to the curable silicone-based release agent of the present invention. Various conventional curing catalysts can be used in this invention. Of these, an onium salt type curing catalyst is preferably used especially when the polyorganosiloxane is a compound represented by the formula (I) above. Examples of the onium salt type curing catalyst include diazonium salts, sulfonium salts, and iodonium salts respectively represented by the formulae:

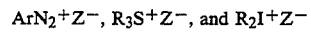

wherein Ar represents an aryl group (e.g., phenyl or an alkylphenyl), R represents an alkyl or aryl group, and Z represents a non-basic and non-nucleophilic anion such as $BF_4$, $PF_6$, $AsF_6$, $SbF_6$, $SbCl_6$, $HSO_4$, or $ClO_4$.

The amount of the curing catalyst added to the release agent usually is from 0.1 to 20 parts by weight, preferably from 1 to 10 parts by weight, per 100 parts by weight of the polyorganosiloxane. If the amount of the curing catalyst added is below 0.1 part by weight, the resulting release agent shows poor curability. If the amount thereof exceeds 20 parts by weight, there are cases where cured films formed from the release agent show poor releasability.

A monomer having one or more epoxy functional groups may be added to the curable silicone-based release agent of the present invention, if required and necessary. Use of the monomer is advantageous particularly when the polyorganosiloxane is a compound represented by the formula (I) above. Addition of the monomer serves to improve the dispersibility of a curing catalyst, particularly an onium salt type curing catalyst, thereby contributing to an improvement in the ultraviolet or heat curability of the release agent and in the printability of cured films to be obtained from the release agent.

Examples of the monomer having an epoxy functional group generally include ethylene glycol diglycidyl ether, glycerol diglycidyl ether, vinylcyclohexene dioxide, limonene dioxide, (3,4-epoxycyclohexyl)methyl-3',4'-epoxycyclohexanecarboxylate, and bis(6-methyl-3,4-epoxycyclohexyl) adipate.

The monomer having an epoxy functional group is generally added in an amount of from 1 to 10,000 parts by weight, preferably from 10 to 1,000 parts by weight, per 100 parts by weight of the polyorganosiloxane. In the case of adding this monomer, it is appropriate to add an onium salt type curing catalyst in an amount of from 0.1 to 20 parts by weight per 100 parts by weight of the sum of the monomer and the polyorganosiloxane.

The curable silicone-based release agent of the present invention can be prepared by suitably mixing the ingredients described above. The mixing order of the ingredients is not particularly limited. From the standpoint of obtaining a homogeneous mixture, it is advantageous to employ a mixing method in which a polyorganosiloxane is mixed first with a curing catalyst, if used, and then with resin fine particles. If the mixture prepared has too high viscosity, one or more of the ingredients may be added in the form of a solution or dispersion in an organic solvent.

In treating a substrate with the curable silicone-based release agent of the present invention to form a release film thereon, the coating operation is carried out in the same manner as in the conventional curable silicone-based release agents. For example, a substrate to be treated is coated with the release agent at a coating amount of about from 0.1 to 10 g/m² using a suitable apparatus such as a squeeze coater, and the coating layer is cured by heating, ultraviolet irradiation, or other treatment to form a release film.

The substrate to be treated with the release agent is not particularly limited. Examples of the substrate generally include papers, plastic-laminated papers, cloths, plastic-laminated cloths, plastic films, and metal foils. The means for heating the coating layer or for irradiating it with ultraviolet rays is also not particularly limited. In general, a means for heating with hot air, an ultraviolet-irradiating means employing an ultraviolet source such as a high-pressure mercury lamp or metal halide lamp, or a similar means can be used.

The heating temperature for forming a cured film is suitably determined while the heat resistance of the substrate is taken into account. However, heating is generally conducted at a temperature of from 60° to 200° C., preferably from 100° to 150° C. The irradiation dose for ultraviolet irradiation is suitably determined according to the curing properties of the release agent. It is possible to conduct heat treatment and ultraviolet irradiation in combination.

In another embodiment of the present invention, there is provided a separator which comprises a substrate and a cured film formed from the release agent of the present invention on one or both sides of the substrate. This separator is, for example, used for the purpose of protecting the pressure-sensitive adhesive layer in a double-side pressure-sensitive tape until use, by adhering the same to the pressure-sensitive adhesive layer surface. The curable silicone-based release agent of the present invention can also be used in various purposes such as back-side treatment of a pressure-sensitive tape.

As described above, the curable silicone-based release agent of the present invention has an excellent curability by heating or ultraviolet irradiation, and cured films obtained therefrom have an excellent balance between adhesion and releasability and are also excellent in oil-based ink printability and especially in the ability to fix printed oil-based inks thereto.

The present invention will be explained below in more detail by reference to the following examples, but the invention is not construed as being limited thereto. In the following, all parts, percents, ratios, and the like are by weight unless otherwise indicated.

REFERENCE EXAMPLE

Preparation of Polyorganosiloxane

Into a three-necked flask made of glass and equipped with a stirrer, a thermometer, and a dropping funnel was introduced a solution prepared by dissolving 33.5 parts of 4-vinylcyclohexene monoxide and 121.1 parts of poly(ethylene glycol) allyl methyl ether (number-average molecular weight: 450) in 200 parts of ethyl acetate. The solution in the flask was stirred for 30 minutes under a dry nitrogen stream, and 2 parts of a platinum catalyst (platinum-vinylsiloxane complex) for hydrosilylation was then added thereto. The resulting mixture was stirred for 10 minutes and heated to 40° C.

To the mixture which was kept being stirred and heated at 40° C., 100 parts of a dimethylsiloxane-methyl-hydrogensiloxane copolymer having a number-average molecular weight of 2,000 was gradually added dropwise over a period of about 1 hour. Thereafter, the reaction system was maintained at 75° C. for 10 hours to proceed the reaction. The dimethylsiloxane-methylhydrogensiloxane copolymer used above is represented by the following formula:

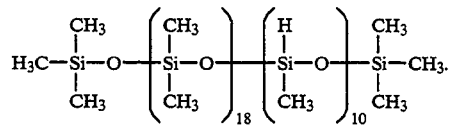

In the molecule of the above formula, the following structural units were arranged at random.

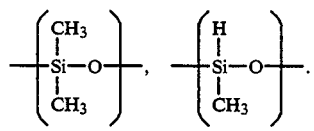

The reaction mixture thus obtained was placed in a vacuum dryer and the ethyl acetate was evaporated, thereby obtaining the desired polymer. Analyses by infrared absorption spectrometry and NMR spectrometry revealed that the product obtained had the following molecular structure, and the number-average molecular weight thereof was 4,700.

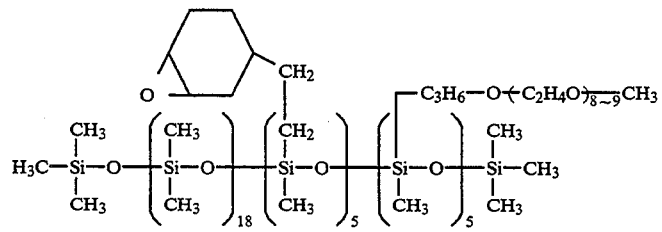

In the molecule of the above formula, the following structural units were arranged at random.

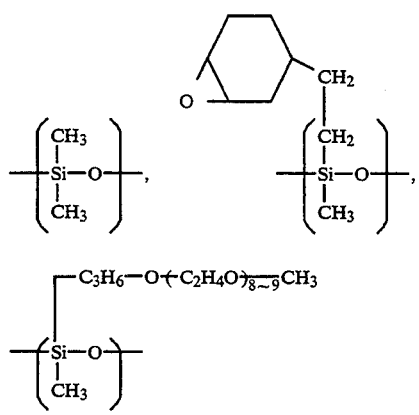

EXAMPLE 1

To 100 parts of the polyorganosiloxane obtained in the Reference Example above was added 5 parts of an ultraviolet-activative type sulfonium salt curing catalyst. The resulting mixture was stirred sufficiently, and 10 parts of poly(methyl methacrylate) fine particles having an average particle diameter of 5 μm were then added thereto and mixed to prepare a homogeneous mixture. Thus, a curable silicone-based release agent according to the present invention was obtained.

Using a squeeze coater, the release agent obtained above was coated on a polyethylene side of a polyethylene-laminated kraft paper having a thickness of 120 μm at a coating amount of 1 g/m². The coated surface was then irradiated (at 500 mJ/cm²) using an ultraviolet irradiator having a high-pressure mercury lamp to cure the coating, thereby obtaining a separator.

EXAMPLE 2

To 50 parts of the polyorganosiloxane obtained in the Reference Example above were added 50 parts of 3,4-epoxycyclohexylmethyl-3',4'-epoxycyclohexanecarboxylate and 5 parts of an ultraviolet-activative type sulfonium salt curing catalyst. The resulting mixture was stirred sufficiently, and 10 parts of poly(methyl methacrylate) fine particles having an average particle diameter of 5 μm were then added thereto and mixed to prepare a homogeneous mixture. Thus, a curable silicone-based release agent according to the present invention was obtained. Using this release agent, a separator was obtained in the same manner as in Example 1.

EXAMPLE 3

A curable silicone-based release agent and a separator according to the present invention were obtained in the same manner as in Example 2 except that poly(methyl methacrylate) fine particles having an average particle diameter of 0.03 μm were used in place of the fine particles used in Example 2.

EXAMPLE 4

A curable silicone-based release agent and a separator according to the present invention were obtained in the same manner as in Example 2 except that polystyrene fine particles having an average particle diameter of 6 μm were used in place of the poly(methyl methacrylate) fine particles.

EXAMPLE 5

A curable silicone-based release agent and a separator according to the present invention were obtained in the same manner as in Example 2 except that the amount of the poly(methyl methacrylate) fine particles was changed to 25 parts.

EXAMPLE 6

A separator according to the present invention was obtained in the same manner as in Example 1 except that a polyethylene-laminated cloth was used in place of the polyethylene-laminated kraft paper.

EXAMPLE 7

A separator according to the present invention was obtained in the same manner as in Example 2 except that a polyethylene-laminated cloth was used in place of the polyethylene-laminated kraft paper.

COMPARATIVE EXAMPLE 1

To 100 parts of the polyorganosiloxane obtained in the Reference Example above was added 5 parts of an ultraviolet-activative type sulfonium salt curing catalyst. The resulting mixture was stirred sufficiently to obtain a silicone-based release agent. Using this release agent, a separator was obtained in the same manner as in Example 1.

COMPARATIVE EXAMPLE 2

To 100 parts of the polyorganosiloxane obtained in the Reference Example above was added 5 parts of an ultraviolet-activative type sulfonium salt curing catalyst. The resulting mixture was stirred sufficiently, and 10 parts of phenyl group-containing silicone rubber elastomer fine particles having an average particle diameter of 5 μm were then added thereto and mixed uniformly to obtain a silicone-based release agent. Using this release agent, a separator was obtained in the same manner as in Example 1.

EXAMPLE 8

To 100 parts of a non-solvent, addition reaction type silicone (KNS-305, manufactured by Shin-Etsu Chemical Co., Ltd., Japan) was added 1 part of a curing catalyst therefor (PL-7, manufactured by Shin-Etsu Chemical Co., Ltd.). The resulting mixture was stirred sufficiently, and 10 parts of poly(methyl methacrylate) fine particles having an average particle diameter of 0.1 μm were then added thereto and mixed to prepare a homogeneous mixture. Thus, a curable silicone-based release agent according to the present invention was obtained.

Using a squeeze coater, the curable silicone-based release agent obtained above was coated on a polyethylene side of a polyethylene-laminated kraft paper having a thickness of 120 μm at a coating amount of 1 g/m². The coating was then cured by heating the coated paper in a circulating hot-air drying oven at 110° C. for 1 minute, thereby obtaining a separator.

EXAMPLE 9

A curable silicone-based release agent and a separator according to the present invention were obtained in the same manner as in Example 8 except that the amount of the poly(methyl methacrylate) fine particles was changed to 25 parts.

EXAMPLE 10

To 100 parts of a non-solvent, cationic polymerization type silicone (UV-9300, manufactured by Toshiba Silicone Co., Ltd., Japan) was added 2 parts of a curing catalyst therefor (UV-9310C, manufactured by Toshiba Silicone Co., Ltd.). The resulting mixture was stirred sufficiently, and 10 parts of poly(methyl methacrylate) fine particles having an average particle diameter of 0.1 μm were then added thereto and mixed to prepare a homogeneous mixture. Thus, a curable silicone-based release agent according to the present invention was obtained. Using this release agent, a separator was obtained in the same manner as in Example 8.

EXAMPLE 11

A curable silicone-based release agent and a separator according to the present invention were obtained in the same manner as in Example 10 except that heavy-releasing cured film-forming type silicone (XS56-A2775, manufactured by Toshiba Silicone Co., Ltd.) was used as a non-solvent, cationic polymerization type silicone.

COMPARATIVE EXAMPLE 3

A silicone-based release agent and a separator were obtained in the same manner as in Example 8 except that poly(methyl methacrylate) fine particles were not added to the release agent.

COMPARATIVE EXAMPLE 4

A silicone-based release agent and a separator were obtained in the same manner as in Example 10 except that poly(methyl methacrylate) fine particles were not added to the release agent.

EVALUATION TESTS

Each of the separators obtained in the Examples and the Comparative Examples was evaluated for the following properties.

Curability

The separator was tested for tackiness on the release film side. Separators having no tackiness are expressed by ⊚, those having slight tackiness by Δ, and those having considerable tackiness by x.

Releasability

A commercially available pressure-sensitive tape having a width of 25 mm (Cloth Tape No. 757N for Examples 6 and 7 and Kraft Tape No. 7170 for the remaining examples, both tapes being manufactured by Nitto Denko Corporation, Japan) is applied to the separator on its release film side by pressing the tape against the separator by moving a 2 kg rubber roller forward and backward once on the tape under conditions of 20° C. and 65% R.H. The thus-bonded separator and pressure-sensitive tape are allowed to stand at 20° C. for 48 hours while the tape was kept being pressed against the separator at 50 g/cm$^2$ by placing a weight on the tape. Thereafter, the weight is removed and the resulting separator and pressure-sensitive tape bonded with each other were allowed to stand at 20° C. and 65% R.H. for 2 hours. Using a Schopper tensile tester, the pressure-sensitive tape is then peeled (180° peel) from the separator at a rate of 300 mm/min, and the force required for the peeling is measured.

Percentage of Retention of Adhesion
(Non-staining property of pressure-sensitive adhesive surface)

The pressure-sensitive tape which had been used in the releasability test described above is applied to a stainless-steel plate (SUS 27CP), a surface thereof being polished sufficiently with a water-resistant polishing paper (#280) and then cleaned. The application of the pressure-sensitive tape to the plate is accomplished by pressing the tape against the plate by moving a 2 kg rubber roller forward and backward once on the tape under conditions of 20° C. and 65% R.H. The thus-bonded pressure-sensitive tape and stainless-steel plate are allowed to stand for 30 minutes, and the tape is then peeled from the plate and the force required for the peeling is measured in the same manner as in the above releasability test. From the thus-obtained peel strength value and from a separately determined peel strength value for a fresh pressure-sensitive tape which is not contacted with the release film, the percentage of retention of adhesion is calculated, which is the percentage of the former to the latter peel strength value.

Printability

With two kinds of commercially available oil-based ink pens, that is, Pen A employing an ink containing a hydrocarbon type solvent as a main component and Pen B employing an ink containing an alcohol type solvent as a main component, characters are written on a release film side of the separator. Separators showing no repelling are indicated by ⊚, those showing almost no repelling by ○, those showing slight repelling by Δ, and those showing considerable repelling by x.

Ink-Fixing Ability

This test is conducted in order to evaluate the separator for ink-fixing ability, which is required, for example, when a pressure-sensitive tape is used to seal packages, with characters written on the pressure-sensitive tape on its release film side, and the character-bearing surfaces undergo abrasion during package-loading operations. In this test, characters are written on the separator in the same manner as in the above printability test. Ten minutes later, the character-bearing surface is rubbed with a dry cloth by moving the cloth on the surface forward and backward three times, and the resulting characters are examined for readability.

Separators showing no change (no ink falling) through dry cloth rubbing are shown by ⊚, those in which the characters are able to be easily read although slight ink falling has occurred are shown by ○, those in which considerable ink falling has occurred with only a minor part of the characters remaining but the characters can be read with great difficulty if examined carefully are shown by Δ, and those in which the characters are unable to be read due to ink falling are shown by x.

The results obtained in the above tests are shown in the Table below.

Comparative Example 5 shown in the Table is the evaluation result of the same polyethylene-laminated kraft paper alone used as a separator substrate in the Examples.

TABLE

| | Curability (tackiness) | Releasability (g/25 mm) | Percentage of Retention of Adhesion (%) | Printability (Repelling) | | Ink-Fixing Ability | |
|---|---|---|---|---|---|---|---|
| | | | | Pen A | Pen B | Pen A | Pen B |
| Example 1 | ○ | 230 | 90 | ○ | ○ | ⊚ | ⊚ |
| Example 2 | ○ | 460 | 95 | ○ | ⊚ | ⊚ | ⊚ |
| Example 3 | ○ | 375 | 98 | ○ | ⊚ | ⊚ | ⊚ |
| Example 4 | ○ | 520 | 92 | ⊚ | ○ | ⊚ | ⊚ |
| Example 5 | ○ | 575 | 92 | ⊚ | ⊚ | ⊚ | ⊚ |
| Example 6 | ○ | 195 | 93 | ○ | ⊚ | ⊚ | ⊚ |
| Example 7 | ○ | 380 | 97 | ○ | ⊚ | ⊚ | ⊚ |
| Comparative Example 1 | ○ | 15 | 97 | Δ | Δ | x | x |
| Comparative Example 2 | ○ | 85 | 89 | ○ | Δ | Δ | x |
| Example 8 | ○ | 10 | 95 | ○ | ○ | ○ | ○ |
| Example 9 | ○ | 20 | 92 | ⊚ | ⊚ | ⊚ | ⊚ |
| Example 10 | ○ | 10 | 91 | ○ | ○ | ○ | ○ |
| Example 11 | ○ | 120 | 90 | ○ | ⊚ | ○ | ○ |
| Comparative Example 3 | ○ | 5 | 95 | x | x | x | x |
| Comparative | ○ | 10 | 93 | x | x | x | x |

TABLE-continued

|  | Curability (tackiness) | Releasability (g/25 mm) | Percentage of Retention of Adhesion (%) | Printability (Repelling) Pen A | Pen B | Ink-Fixing Ability Pen A | Pen B |
|---|---|---|---|---|---|---|---|
| Example 4 Comparative Example 5 | — | 1130 | 80 | ⊚ | ⊚ | ⊚ | ⊚ |

The results in the Table above show that all of the release agents of the Examples according to the present invention exhibit excellent curability, and the cured films formed from these release agents have an excellent balance between adhesion and releasability and are also excellent in oil-based ink printability, especially in the ability to fix printed oil-based inks thereto.

While the invention has been described in detail and with reference to specific embodiments thereof, it will be apparent to one skilled in the art that various changes and modifications can be made therein without departing from the spirit and scope thereof.

What is claimed is:

1. A curable silicone-based release agent consisting essentially of 100 parts by weight of a polyorganosiloxane and from 0.1 to 1,000 parts by weight of resin fine particles which are readily swellable or soluble in an organic solvent, said release agent being capable of forming a cured film having an oil-based ink absorbing property;

wherein said resin fine particles are fine particles of an acrylic resin or crosslinked acrylic resin, and wherein said resin fine particles have an average particle diameter of from 0.001 to 100 μm, and wherein said polyorganosiloxane is a polyorganosiloxane represented by the formula:

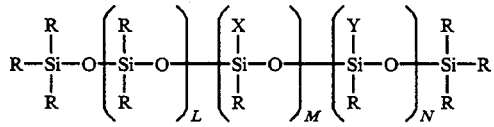

wherein R represents an alkyl group having from 1 to 20 carbon atoms, a cycloalkyl group, an aryl group, or an aralkyl group, X represents an epoxy-functional organic group, Y represents a polyether-polymethylene group, and L, M, and N are numbers such that M/(L+M+N) is from 0.5% to 90% and N/(L+M+N) is from 0.5% to 90%, and wherein Y represents a polyether-polymethylene group of the following formula (I):

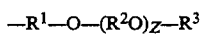

$$-R^1-O-(R^2O)_Z-R^3$$

wherein $R^1$ represents a polymethylene group; $R^2$ represents an ethylene group, propylene group, or butylene group; $R^3$ represents a hydrogen atom or an alkyl group having from 1 to 20 carbon atoms; and wherein Z is from 2 to 100.

2. A release agent as claimed in claim 1, wherein said polyorganosiloxane has a number-average molecular weight of from 100 to 500,000.

3. A release agent as claimed in claim 1, wherein said polyorganosiloxane has a number-average molecular weight of from 1,000 to 100,000.

4. A release agent as claimed in claim 1, wherein the amount of said resin fine particles is from 1 to 100 parts by weight per 100 parts by weight of the polyorganosiloxane.

5. A release agent as claimed in claim 1, which further contains a curing catalyst.

6. A release agent as claimed in claim 5, wherein said curing catalyst is an onium salt curing catalyst.

7. A release agent as claimed in claim 6, wherein the amount of said curing catalyst is from 0.1 to 20 parts by weight per 100 parts by weight of the polyorganosiloxane.

8. A release agent as claimed in claim 7, wherein the amount of said curing catalyst is from 1 to 10 parts by weight per 100 parts by weight of the polyorganosiloxane.

9. A release agent as claimed in claim 1, which further contains a monomer having an epoxy functional group.

10. A release agent as claimed in claim 9, wherein the amount of said monomer is from 1 to 10,000 parts by weight per 100 parts by weight of the polyorganosiloxane.

11. A separator comprising a substrate having formed thereon a cured film formed from the curable silicone-based release agent as claimed in claim 1.

12. A pressure-sensitive tape having on the back side thereof a cured film formed from the curable silicone-based release agent as claimed in claim 1.

13. A pressure-sensitive tape as claimed in claim 12, which is in a roll form.

14. A method for packaging using a pressure sensitive tape, comprising sealing an open package with a pressure sensitive tape having on the back side thereof a cured film formed from a curable silicon based release agent consisting essentially of 100 parts by weight of a polyorganosiloxane and from 0.1 to 1,000 parts by weight of resin fine particles which are readily swellable or soluble in an organic solvent, said release agent being capable of forming a cured film having an oil-based ink absorbing property;

wherein said resin fine particles are fine particles of an acrylic resin or crosslinked acrylic resin, and wherein said resin fine particles have an average particle diameter of from 0.001 to 100 μm, and wherein said polyorganosiloxane is a polyorganosiloxane represented by the formula:

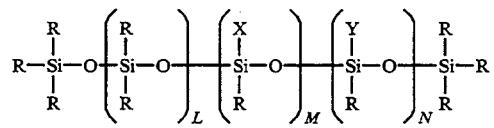

wherein R represents an alkyl group having from 1 to 20 carbon atoms, a cycloalkyl group, an aryl group, or an aralkyl group, X represents an epoxy-functional organic group, Y represents a polyether-polymethylene group, and L, M, and N are numbers such that M/(L+M+N) is from 0.5% to 90% and N/(L+M+N) is from 0.5% to 90%, and wherein Y represents a polyether-polymethylene group of the following formula (I):

$$-R^1-O-(R^2O)_Z-R^3$$

wherein $R^1$ represents a polymethylene group; $R^2$ represents an ethylene group, propylene group, or butylene group; $R^3$ represents a hydrogen atom or an alkyl group having from 1 to 20 carbon atoms; and wherein Z is from 2 to 100.

* * * * *